Figure 3:
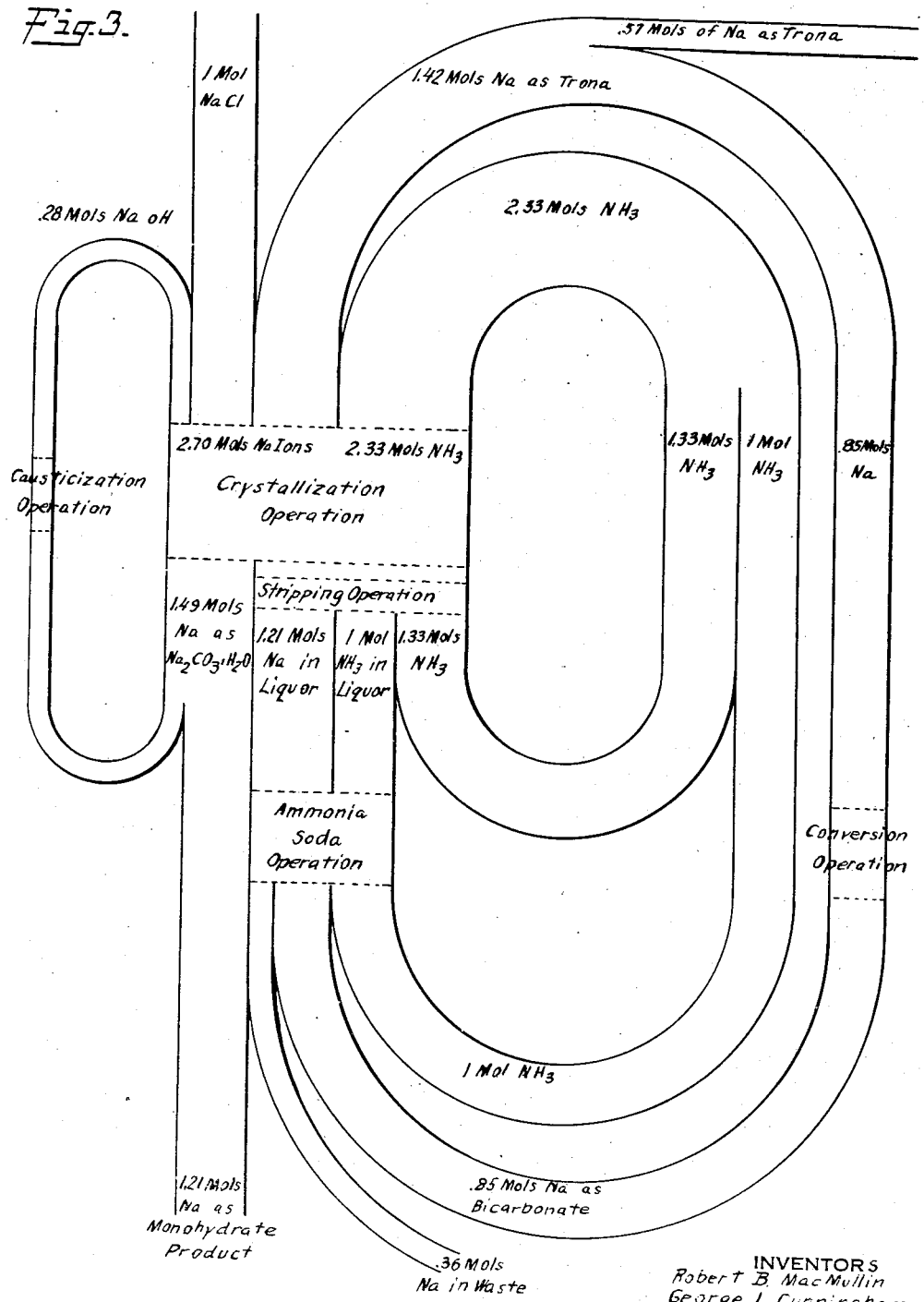

March 19, 1935. R. B. MacMULLIN ET AL 1,994,892
PROCESS FOR CONVERTING SODIUM SESQUICARBONATE TO SODIUM MONOHYDRATE
Filed July 6, 1932 2 Sheets-Sheet 1
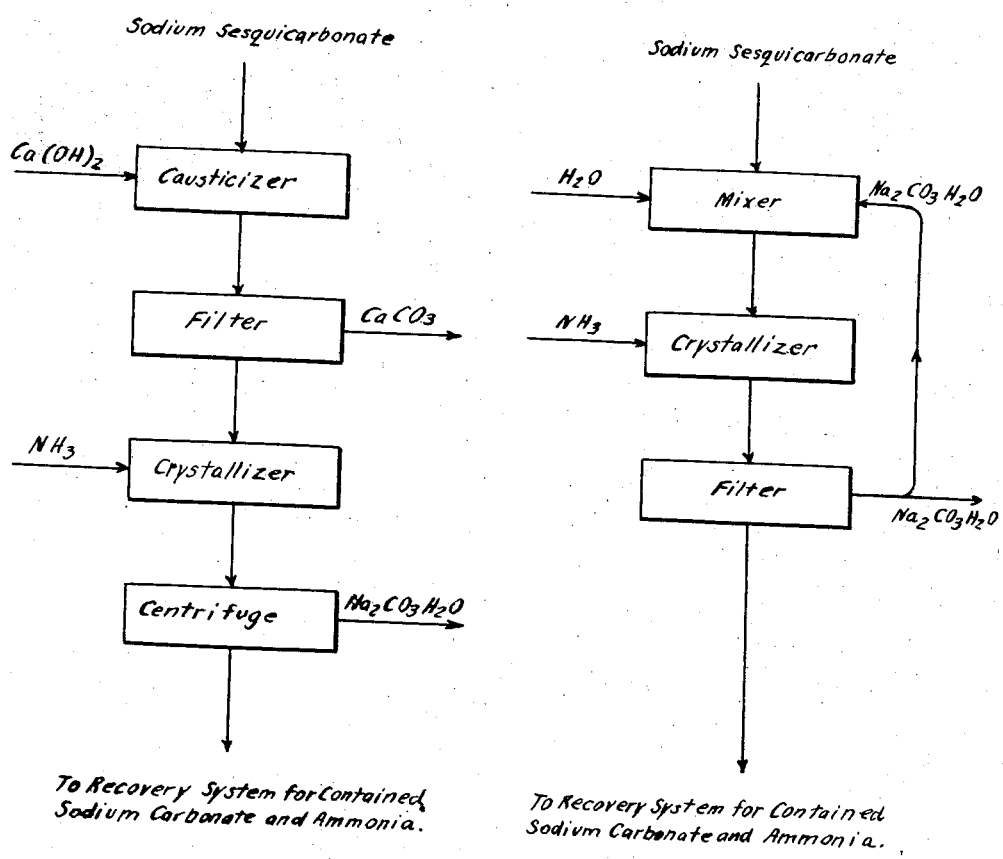
INVENTORS
Robert B. MacMullin
George L. Cunningham
BY
Pennie, Davis, Marvin + Edmonds
ATTORNEYS March 19, 1935. R. B. MacMULLIN ET AL 1,994,892
PROCESS FOR CONVERTING SODIUM SESQUICARBONATE TO SODIUM MONOHYDRATE
Filed July 6, 1932 2 Sheets-Sheet 2

INVENTORS
Robert B. MacMullin
George L. Cunningham
BY
Pennie, Davis, Marvin & Edmonds
ATTORNEYS Patented Mar. 19, 1935

1,994,892

UNITED STATES PATENT OFFICE 1,994,892

PROCESS FOR CONVERTING SODIUM SESQUICARBONATE TO SODIUM MONOHYDRATE

Robert B. MacMullin and George Lewis Cunningham, Niagara Falls, N. Y., assignors to The Mathieson Alkali Works, Inc., New York, N. Y., a corporation of Virginia Application July 6, 1932, Serial No. 621,058

12 Claims. (Cl. 23—63)

This invention relates to improvements in the manufacture of sodium carbonate monohydrate, $Na_2CO_3.H_2O$. More particularly, the invention relates to improvements in the conversion of sodium sesquicarbonate, $NaHCO_3.Na_2CO_3.2H_2O$, to sodium carbonate monohydrate. Broadly, the invention comprises decarbonation of an aqueous solution of sodium sesquicarbonate to an extent such that the molecular ratio $CO_2:Na$ of the solution is less than 0.6 and thereafter precipitating sodium carbonate monohydrate from the solution by the addition of ammonia in proportion less than that precipitating sodium carbamate, $NaNH_2CO_2$. Specifically, the invention includes, in one aspect, decarbonation of the aqueous solution of sodium sesquicarbonate by precipitation of an insoluble carbonate and, in another aspect, decarbonation of the aqueous solution of sodium sesquicarbonate by the addition of sodium hydroxide or a sodium carbonate less highly carbonated than sodium sesquicarbonate, sodium carbonate, $Na_2CO_3$, for example.

In an aqueous solution of sodium sesquicarbonate the ratio $CO_2:Na$ is 0.666. We have found that the precipitation of sodium carbonate monohydrate by the addition of ammonia to such solutions, in the general manner described in an application filed March 25, 1932, Serial Number 601,144 by Robert B. MacMullin, is much facilitated if the ratio $CO_2:Na$ is first reduced to a value less than 0.6. This reduction of the ratio $CO_2:Na$ can be accomplished in several ways. Carbon dioxide can be removed from the solution by precipitation as an insoluble carbonate, by the addition of a soluble oxide or hydroxide of a metal forming an insoluble carbonate, calcium oxide or calcium hydroxide, for example, the precipitated insoluble carbonate being separated from the solution, and sodium carbonate monohydrate thereafter precipitated from the solution by appropriate addition of ammonia. Or, sodium hydroxide, NaOH, or sodium carbonate, $Na_2CO_3$, can be added to the solution in amount sufficient to reduce the ratio $CO_2:Na$ to a value less than 0.6. Sodium carbonate monohydrate, as well as anhydrous sodium carbonate, for example, can be used in this manner, and we have discovered that much less sodium carbonate monohydrate is required to be added to bring the ratio $CO_2:Na$ within this limit than is recovered, above what otherwise would be recovered, from the modified solution. The aqueous solutions of sodium sesquicarbonate in which the invention is carried out may be free from sodium chloride or may contain sodium chloride up to saturation.

The invention will be illustrated by the following specific examples:

I. A solution of 73.5 parts (by weight) of sodium sesquicarbonate in about 180 parts of water is treated with about 3 parts of calcium hydroxide. The temperature of treatment is unimportant. Temperatures of 20°–60° C. are satisfactory. The precipitated calcium carbonate is separated in any convenient manner, by filtration for example, and sodium carbonate monohydrate is then precipitated from the liquor by the addition of ammonia while maintaining the ratio $NH_3:Na$ in the range of about 1: 1–3: 1.

Instead of dissolving the sodium sesquicarbonate in water, as in the foregoing example, it may be dissolved in an aqueous solution of sodium chloride substantially saturated with respect to sodium chloride.

II. 28.5 parts of sodium carbonate monohydrate are added to a solution of 39.8 parts of sodium sesquicarbonate in 180 parts of water, and about 59 parts of ammonia gas are then added to this mixture while maintaining a temperature of 20°–60° C. About 46 parts of sodium carbonate monohydrate are precipitated and separated from the liquor. In a cyclic operation, 28.5 parts of this sodium carbonate monohydrate are re-used in the next cycle, the net recovery being about 17.5 parts of sodium carbonate monohydrate per cycle. The liquor from which the sodium carbonate monohydrate has been separated can be subjected to any conventional recovery operations.

Instead of dissolving the sodium sesquicarbonate in water, as in the foregoing example, it may be dissolved in an aqueous solution of sodium chloride substantially saturated with respect to sodium chloride.

III. 11 parts of sodium hydroxide are added to a solution of 155 parts of sodium sesquicarbonate and 58.5 parts of sodium chloride in 183.5 parts of water, and about 40 parts of ammonia gas are then added to this mixture, while maintaining a temperature of 20°–60° C. About 92 parts of sodium carbonate monohydrate are precipitated and separated from the liquor. Causticization of about 19% of this recovered sodium carbonate monohydrate will yield the 11 parts of sodium hydroxide required for repetition of the operation, leaving a net recovery of 75 parts of sodium carbonate monohydrate per cycle.

The operation illustrated by Example III can be combined with carbonation and recovery operations as practiced in the conventional ammonia-soda process in a particularly advantageous manner as illustrated in the following example:

IV. 22.6 parts of ammonia are stripped from the liquor from which the sodium carbonate monohydrate has been separated, in the operation of Example III, by distillation, for example. The resulting ammoniacal brine is then carbonated, as in the conventional ammonia-soda process, to precipitate 71 parts of sodium bicarbonate. This precipitated sodium bicarbonate is separated from the liquor in the usual way, and the ammonia and carbon dioxide content of the liquor are recovered in the usual way, the ammonia being used in the precipitation of sodium carbonate monohydrate in the complete operation, as in Example III. Part of the sodium sesquicarbonate supplied to the operation may be produced by conversion of the sodium bicarbonate produced in the operation.

The accompanying drawings illustrate, as flow sheets, three operations embodying the invention. Fig. 1 further illustrates operations of the type illustrated by Example I. Fig. 2 further illustrates operations of the type illustrated by Example II. Fig. 3 further illustrates operations of the type illustrated by the combined operations of Examples III and IV.

We claim:

1. In the conversion of sodium sesquicarbonate to sodium carbonate monohydrate, the improvement which comprises decarbonating an aqueous solution of sodium sesquicarbonate to an extent such that the ratio $CO_2:Na$ of the solution is less than 0.6 and thereafter precipitating sodium carbonate monohydrate from the solution by the addition of ammonia in proportion less than that precipitating sodium carbamate.

2. In the conversion of sodium sesquicarbonate to sodium carbonate monohydrate, the improvement which comprises adding an oxide of a metal forming an insoluble carbonate to an aqueous solution of sodium sesquicarbonate to precipitate carbon dioxide as an insoluble carbonate until the ratio $CO_2:Na$ of the solution is less than 0.6, removing of the insoluble carbonate and thereafter precipitating sodium carbonate monohydrate from the solution by the addition of ammonia in proportion less than that precipitating sodium carbamate.

3. In the conversion of sodium sesquicarbonate to sodium carbonate monohydrate, the improvement which comprises adding sodium hydroxide to an aqueous solution of sodium sesquicarbonate until the ratio $CO_2:Na$ of the solution is less than 0.6 and thereafter precipitating sodium carbonate monohydrate from the solution by the addition of ammonia in proportion less than that precipitating sodium carbamate.

4. In the conversion of sodium sesquicarbonate to sodium carbonate monohydrate, the improvement which comprises adding an oxide of a metal forming an insoluble carbonate to an aqueous solution of sodium sesquicarbonate also containing sodium chloride to precipitate carbon dioxide as an insoluble carbonate until the ratio $CO_2:Na$ of the solution is less than 0.6, removing the insoluble carbonate and thereafter precipitating sodium carbonate monohydrate from the solution by the addition of ammonia in proportion less than that precipitating sodium carbamate.

5. In the conversion of sodium sesquicarbonate to sodium carbonate monohydrate, the improvement which comprises adding sodium hydroxide to an aqueous solution of sodium sesquicarbonate also containing sodium chloride until the ratio $CO_2:Na$ of the solution is less than 0.6 and thereafter precipitating sodium carbonate monohydrate from the solution by the addition of ammonia in proportion less than that precipitating sodium carbamate.

6. In the conversion of sodium sesquicarbonate to sodium carbonate monohydrate, the improvement which comprises adding sodium carbonate monohydrate to an aqueous solution of sodium sesquicarbonate until the ratio $CO_2:Na$ of the solution is less than 0.6 and thereafter precipitating sodium carbonate monohydrate from the solution by the addition of ammonia in proportion less than that precipitating sodium carbamate.

7. In the conversion of sodium sesquicarbonate to sodium carbonate monohydrate, the improvement which comprises adding a base of a metal forming an insoluble carbonate to an aqueous solution of sodium sesquicarbonate to precipitate carbon dioxide as an insoluble carbonate until the ratio $CO_2:Na$ of the solution is less than 0.6, removing the insoluble carbonate and thereafter precipitating sodium carbonate monohydrate from the solution by the addition of ammonia in proportion less than that precipitating sodium carbamate.

8. In the conversion of sodium sesquicarbonate to sodium carbonate monohydrate, the improvement which comprises adding an hydroxide of a metal forming an insoluble carbonate to an aqueous solution of sodium sesquicarbonate to precipitate carbon dioxide as an insoluble carbonate until the ratio $CO_2:Na$ of the solution is less than 0.6, removing the insoluble carbonate and thereafter precipitating sodium carbonate monohydrate from the solution by the addition of ammonia in proportion less than that precipitating sodium carbamate.

9. In the conversion of sodium sesquicarbonate to sodium carbonate monohydrate, the improvement which comprises adding a base of a metal forming an insoluble carbonate to an aqueous solution of sodium sesquicarbonate also containing sodium chloride to precipitate carbon dioxide as an insoluble carbonate until the ratio $CO_2:Na$ of the solution is less than 0.6, removing the insoluble carbonate and thereafter precipitating sodium carbonate monohydrate from the solution by the addition of ammonia in proportion less than that precipitating sodium carbamate.

10. In the conversion of sodium sesquicarbonate to sodium carbonate monohydrate, the improvement which comprises adding an hydroxide of a metal forming an insoluble carbonate to an aqueous solution of sodium sesquicarbonate also containing sodium chloride to precipitate carbon dioxide as an insoluble carbonate until the ratio $CO_2:Na$ of the solution is less than 0.6, removing the insoluble carbonate and thereafter precipitating sodium carbonate monohydrate from the solution by the addition of ammonia in proportion less than that precipitating sodium carbamate.

11. In the conversion of sodium sesquicarbonate to sodium carbonate monohydrate, the improvement which comprises adding a sodium carbonate less highly carbonated than sodium sesquicarbonate to an aqueous solution of sodium sesquicarbonate until the ratio $CO_2:Na$ of the solution is less than 0.6 and thereafter precipitating sodium carbonate monohydrate from the solution by the addition of ammonia in proportion less than that precipitating sodium carbamate.

12. In the conversion of sodium sesquicarbonate to sodium carbonate monohydrate, the improvement which comprises adding a sodium carbonate less highly carbonated than sodium sesquicarbonate to an aqueous solution of sodium sesquicarbonate also containing sodium chloride until the ratio $CO_2:Na$ of the solution is less than 0.6 and thereafter precipitating sodium carbonate monohydrate from the solution by the addition of ammonia in proportion less than that precipitating sodium carbamate.

ROBERT B. MacMULLIN.
GEORGE LEWIS CUNNINGHAM.